March 1, 1966  J. MORKOSKI  3,237,701
STABLIZER FOR TOOL BARS
Filed Nov. 19, 1963

INVENTOR.
James Morkoski
Atty.

United States Patent Office 3,237,701
Patented Mar. 1, 1966

3,237,701
STABILIZER FOR TOOL BARS
James Morkoski, Clarendon Hills, Ill., assignor to International Harvester Company, Chicago, Ill., a corporation of New Jersey
Filed Nov. 19, 1963, Ser. No. 324,640
3 Claims. (Cl. 172—451)

This invention relates to agricultural implements and particularly to tractor mounted earth-working devices. More specifically, the invention concerns improved means for stabilizing an implement with respect to the draft forces acting thereon.

It is common practice in the agriculture industry, when it is desired to cover as wide an area as possible in one pass over a field, to mount a considerable number of earth-working tools on an elongated tool bar the ends of which project laterally from opposite sides of the tractor. Since such a tool bar is connected to the tractor by conventional hitch devices centrally of the tool bar, the outer ends of the bar are subject to excessive draft forces tending to bend the ends thereof.

Therefore, the object of this invention is the provision of novel means for stabilizing an implement of the type referred to in order to equalize the draft forces acting thereon.

Another object of the invention is the provision, in an implement of the transversely elongated tool bar type adapted to be rigidly connected to a tractor to be raised thereon for transport by means imparting forward shifting of the tool bar when it is moved from an operating to a transport position, novel stabilizing means for absorbing the draft forces acting on the outer ends of the tool bar while compensating for said forward shifting of the tool bar when it is lifted.

Figure 1:
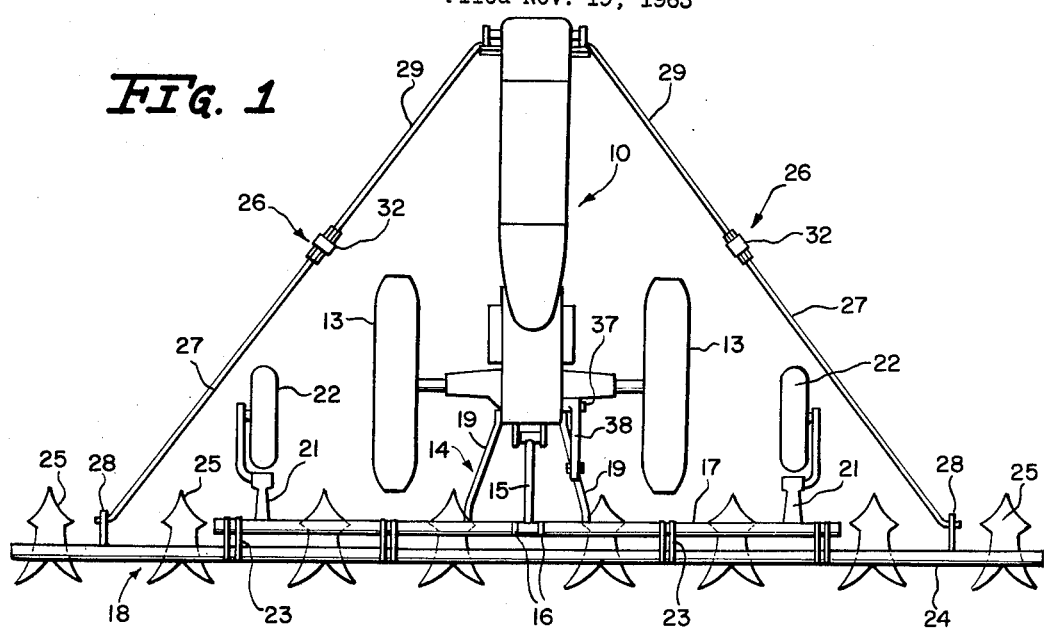
Figure 2:
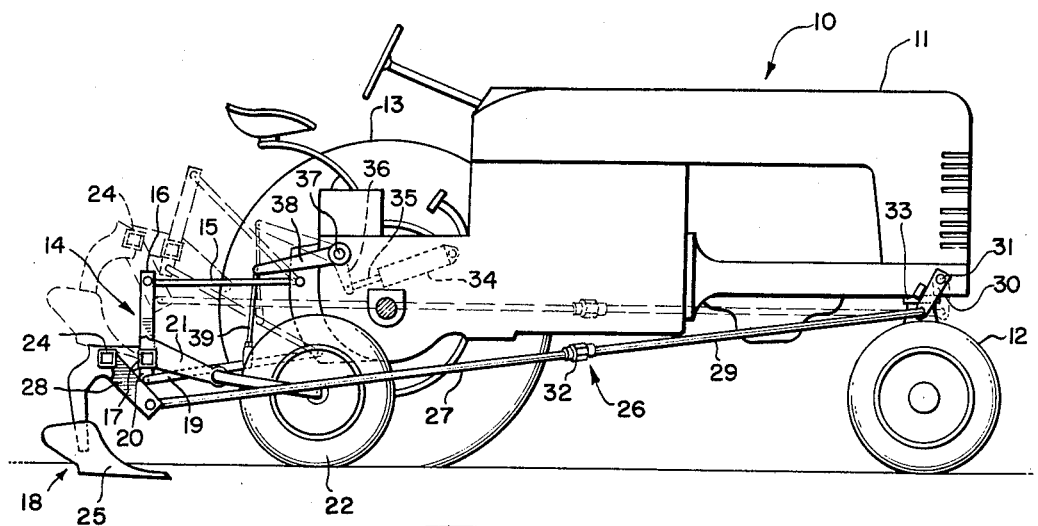

Other objects and advantages of the invention will become clear from the following detailed description when read in conjunction with the accompanying drawings wherein:

FIGURE 1 is a plan view of a tractor and implement combination incorporating the features of this invention; and FIGURE 2 is a view in side elevation, partly in section, of the structure shown in FIGURE 1.

In the drawings the numeral 10 designates a tractor of the tricycle type having a longitudinally extending body 11, a front wheel 12 and laterally spaced rear drive wheels 13. The tractor is also provided at its rear end with power lifted hitch mechanism of the three-point type designated at 14 comprising an upper link 15 pivotally connected at one end to the tractor and its other end to a mast 16 secured to a bar 17 forming part of the frame of an implement 18 illustrated diagrammatically as a multi-row middle buster. The hitch 14 also includes a pair of laterally spaced forwardly converging links 19, the forward ends of which are pivotally connected to the tractor, and the rear ends to lugs 20 affixed to and depending from bar 17.

The frame bar 17 of the implement extends to opposite sides of the tractor beyond the tractor wheels 13 and is provided with brackets 21 upon which are mounted earth-engaging wheels 22 adapted to gauge the depth of operation of the implement in its working position. Also secured to bar 17 and rearwardly thereof by means of clamps 23 is a tool-carrying transversely elongated bar 24 upon which are mounted earth-working tools in the form of middle busters 25, and which extends laterally substantially beyond the ends of frame bar 17.

An operating position of the implement of this invention is shown in FIGURE 2, with the middle buster units 25 penetrating the ground. The connection of the implement to the hitch structure 14 of the tractor is relatively rigid, and in conventional wide implements of this type the outer ends of the implement are incapable of satisfactorily withstanding the draft forces acting upon the outermost earth-working tools. In order to stabilize the implement and prevent damage thereto as well as non-uniform operation incident to the forces affecting the outer ends of the implement, applicant has provided stabilizing means in the form of a pair of forwardly diverging rods 26, each of which comprises a rear section 27, bent laterally and pivotally received in a bracket 28 affixed to the tool bar structure 18 at the ends thereof, and a forward rod section 29 pivotally connected to the lower end of an arm 30 pivoted at 31 on the side of the tractor body. Rods 27 and 29 are adjustably connected by a turnbuckle 32 for adjusting the length of rod member 26 to maintain bar 24 in proper relationship to the path of travel of the implement and tractor. Draft forces encountered by the outer ends of tool bar structure 24 are taken through the rods 26, rearward movement of each of the latter being limited by the provision of a stop 33 also affixed to the side of the tractor body. Thus, during operation of the implement, arm 30 rides against the stop 33 to transmit draft through rods 26 to the outer ends of the implement frame.

The implement is lifted to a transport position by power lift means including a hydraulic cylinder 34 mounted in the tractor body and having a piston rod 35 slidable therein connected to an arm 36 mounted on a rockshaft 37 to which is secured a rearwardly extending lift arm 38 connected at its outer end by a lifting link 39 with one of the lower links 19, it being understood that more than one lift arm 38 may, if desired, be mounted on shaft 37 for connection to links 19.

FIGURE 2 shows in dotted lines the raised or transport position of the implement. The implement is lifted in an arc about the pivotal connections of links 15 and 19 to the tractor, said arc extending upwardly and forwardly and causing the tool bar structure 24 to move or be shifted forwardly in the raised position from the position it occupied during operation. In order to accommodate this lifting of the implement about the pivotal connections of links 15 and 19 to the tractor, each of the arms 30 at the forward end of the tractor is allowed to swing forward freely, arm 30 moving away from stop 33 as soon as the earth-working tools are lifted from the ground, a dotted line position of arm 30 in the raised position of the implement being indicated in FIGURE 2. Immediately upon return of the implement to its working position by actuation of hydraulic cylinder 34 to lower the hitch mechanism 14, arm 30 moves against stop 33 and transmits draft through the rod 26 to the ends of the tool bar 24.

It is believed that the construction and operation of the novel implement stabilizing mechanism of this invention will be clearly understood from the foregoing description. It should likewise be understood that the invention has been described in its preferred embodiment only, and that modifications may be made in the invention without departing from the spirit thereof or the scope of the appended claims.

What is claimed is:

1. In a tractor mounted implement of the transversely elongated type comprising a tool bar structure rigidly connected to the rear of the tractor in draft-receiving relation by power lifted means for raising the implement from an operating to a transport position in a relatively fixed arc upwardly and forwardly and extending to substantial distances laterally from opposite sides of the tractor the combination of connecting means extending between the ends of said tool bar structure and the forward portion of the tractor, said connecting means being adapted to transmit the draft forces of the tractor to the outer ends of said tool bar structure and comprising forwardly extending relatively rigid rods secured at their rear ends to the ends of said tool bar structure, an arm pivotally mounted on the forward portion of the tractor at each side thereof for longitudinal swinging relative thereto, and means pivotally connecting the forward ends of said rods to said arms for longitudinal movement therewith to accommodate said forward movement of said implement when the latter is raised to said transport position.

2. The invention set forth in claim 1, wherein stop means is provided on the tractor and engageable with said arms to limit the rearward swinging thereof.

3. The invention set forth in claim 2, wherein means are provided for adjusting the length of said rods.

References Cited by the Examiner
UNITED STATES PATENTS

| | | | |
|---|---|---|---|
| 2,687,073 | 8/1954 | Thorp | 172—445 |
| 2,747,355 | 5/1956 | Warne | 172—446 X |
| 2,958,383 | 11/1960 | Danielson | 172—456 |
| 3,077,231 | 2/1963 | Hamilton. | |

ABRAHAM G. STONE, *Primary Examiner.*

WILLIAM A. SMITH III, *Examiner.*